United States Patent
Organ et al.

(10) Patent No.: US 6,332,212 B1
(45) Date of Patent: *Dec. 18, 2001

(54) CAPTURING AND DISPLAYING COMPUTER PROGRAM EXECUTION TIMING

(75) Inventors: Donald V. Organ, Saratoga; Mark E. Deome, San Jose; Rajaneekara Techasaratoole, San Jose; Val N. Greene, San Jose, all of CA (US)

(73) Assignee: LTX Corporation, Westwood, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,935

(22) Filed: Oct. 2, 1997

(51) Int. Cl.⁷ ...................................................... G06F 9/45

(52) U.S. Cl. ..................................................... 717/4; 717/1

(58) Field of Search .................................. 395/704; 717/4; 707/509; 709/224; 714/47; 324/758; 712/247

(56) References Cited

U.S. PATENT DOCUMENTS

| | | | |
|---|---|---|---|
| 3,962,685 | * 6/1976 | Belle Isle | 712/247 |
| 5,168,554 | * 12/1992 | Luke | 707/509 |
| 5,442,740 | * 8/1995 | Parikh | 345/440 |
| 5,530,373 | * 6/1996 | Gibson et al. | 324/758 |
| 5,581,696 | * 12/1996 | Kolawa et al. | 714/38 |
| 5,732,272 | * 3/1998 | Gochee | 714/4 |
| 5,768,500 | * 6/1998 | Agrawal et al. | 714/47 |
| 5,832,289 | * 11/1998 | Shaw et al. | 712/30 |
| 5,903,730 | * 5/1999 | Asai et al. | 709/224 |

OTHER PUBLICATIONS

Anthony R. Taylor, "An Analysis of ATE Computational Architecture," LTX/Trillium (prior to Jul. 1997).
Pure Atria, "Performance Engineering", pp. 1–10 (1995–1997).
Pure Atria, "Quantify Product Overview", p. 1 (1995–1997).
Pure Atria, "What's New in Quantify 3.0", pp. 1–2 (1995–1997).
Pure Atria, "Quantify Data Sheet", pp. 1–2 (1995–1997).
Coffee, HiProf polishes profiles, PC Weeks, v14, n40, p48(1), 09,1997.*
Pure Atria, "Viewing Your Data with Quantify," pp. 1–3 (1995–1997).
Deltamaster Product Description, LTX Trillium Digital Products (Nov. 1992).
Robert E. Huston, "For VLSI Testing: An Integrated User Interface and Test Language," Reprinted from Microelectronic Manufacturing and Testing (Aug./Sep. 1988).
LTX Envision Product Brochure (prior to Jul. 1997).

* cited by examiner

Primary Examiner—Mark R. Powell
Assistant Examiner—Hoang-Vu Anthony Nguyen-Ba
(74) Attorney, Agent, or Firm—Blakely, Sokoloff, Taylor & Zafman LLP

(57) ABSTRACT

A software tool for analyzing the real-time performance characteristics of computer programs. A subprogram automatically records the execution time at a large number of pre-identified points in the code to be analyzed. This time information is captured in real-time and is minimally invasive. The display is subsequently displayed using a timing diagram display tool for a graphical user interface. The displayed timing diagrams provides a visual representation of the execution of the software in time, and provides a user to scale the time or show the profile in an alternate perspective. The present invention further provides a graphical representation of the hierarchical execution of subroutines and program modules within the software by displaying the nested execution of the software.

38 Claims, 12 Drawing Sheets

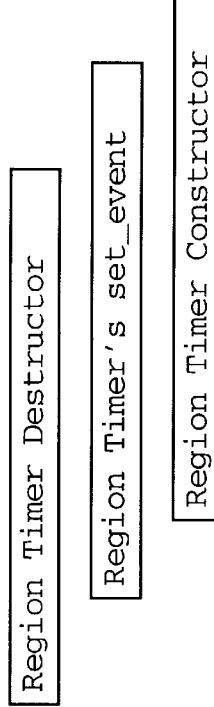

```
A_Class::execute()
{
    Region_Timer rt1 ("execute", __FILE__, __LINE__, this);
    ... // existing code
    for( int i = 0; i < 1; i++ )
    {
        Region_Timer rt2( "for loop", __FILE__, __LINE__, this);
        ... // more existing code
        rt1.set_event( "in time", __FILE__, __LINE__ );
        Region_Timer rt2's Destructor is called
        ... // more existing code
        Region_Timer rt1's Destructor is called
    }
}
```

Region Timer Destructor

Region Timer's set_event

Region Timer Constructor

FIG. 3A

CAPTURING AND DISPLAYING COMPUTER PROGRAM EXECUTION TIMING

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to computer software, and more specifically to displaying the execution timing of a computer program.

BACKGROUND OF THE INVENTION

The performance characteristics of a computer depend largely on the speed with which the software programs are executed. Although fast hardware increases program execution speed, performance increases can often be realized by optimizing the program code itself. Such optimization involves writing programs to execute efficiently and to take full advantage of available hardware resources. The performance of a particular program depends largely on the specific implementation or computer environment for which it is written, however performance bottlenecks that degrade performance may involve one or more common problems. These problems include useless computation produced by code that has been refined but not removed, needless re-computation caused by program modules that recompute values rather than storing results for later use, excessive or unnecessary requests for services that waste time on the service and incur large context switch times, and waiting for services requests to complete.

These bottlenecks provide opportunities for software engineers to increase program execution performance. For example, reducing the number of service or subprogram calls, or eliminating useless calls entirely may effectively reduce the bottlenecks associated with unnecessary computations. Likewise, caching a result for later reuse prevents the need to re-execute an operation.

Optimization of software code to increase program execution performance thus requires an accurate diagnosis and identification of the problems contributing to the execution bottlenecks. Although such diagnosis could be undertaken by a skilled programmer who can study the code to identify potential problem areas, this is an unrealistic approach for most computer programs. Manual processes for diagnosing program execution, such as timing how long a specific region of code takes to execute (either with a hand-held stopwatch, or by inserting additional software to read the computer's timer at places of interest), or by observing external indicators controlled by the software (alarms, LED indicators, etc.), are also available. Though effective, these techniques may be very tedious, since they require manual modification of the source code, and require a great deal of user attention. These constraints become greatly limiting on larger programs as the amount of information generated may become overwhelming. Furthermore, these manual methods provide no visibility into the internal operation of the software unless they have some external manifestation.

Most computer programs are complex structures involving hundreds of thousands of lines of code with nested operations, subroutines, and calls to various system resources. Furthermore, sophisticated programs are typically written in high level languages (e.g., Pascal, C, C++) that hide implementation details from the user. These make the performance implications of code writing much less apparent to the programmer. Thus, the programmer typically has very little insight into the performance characteristics of program code as it is being written. Furthermore, very few tools are available which allow a programmer to analyze the performance of the program after it is written to pinpoint specific bottlenecks in program execution. The software tools that are presently available to help an engineer analyze the execution of a particular section of code generally involve taking a statistical sampling and accumulating the total amount of time a program spends in specific subroutines. Although these methods may accurately show the total amount of time a program spent in a sub-routine, they do not allow the programmer to observe the sequencing of operations and the relationships among hierarchical programs and subroutines. Also, these methods provide no straightforward insight into the coordination of multiple, cooperating processes. These sequences and hierarchical relationships are especially important when the software is controlling external instrumentation, as in industrial control or embedded system software. Furthermore, these methods generally require the recompiling or rebuilding of the software, which may be a very tedious and time-consuming task.

Although the problems described with regard to present software analysis programs apply generally to all computer software, the performance and bottleneck problems are especially acute in test program applications. Test programs, such as those used in Very Large Scale Integrated (VLSI) device test machines involve often complex hierarchical routines for the testing of various devices and operating parameters. Because test costs are often a large portion of the cost of integrated circuit devices, tests that take a long time to execute because of bottlenecks in the test code may add significantly to the cost of these devices.

SUMMARY AND OBJECTS OF THE INVENTION

One of the objects of the present invention is to provide a programmer with a graphical time-line representation of the execution sequence of a computer program or subroutine.

Another of the objects of the present invention is to provide a stack-nested representation in the time domain of the execution of a program to clearly show timing relationships among hierarchical portions of code, such as subroutines and loops within the program.

A further object of the present invention is to provide a stacked representation in the time domain across multiple processes (or processors), to clearly show program execution and stack nesting for several different programs, or concurrence amongst multiple processes.

A yet further object of the present invention is to display timeline and nested data as waveform patterns on a computer display device through a graphical user interface.

A method of displaying the execution timing of a hierarchically organized computer program with one or more subprograms is described. The time duration for execution of each of the subprograms within the computer program is measured. The execution time duration for the subprograms are represented as graphic objects, such that each of the graphic objects corresponds to the execution time of a specific subprogram. The graphic objects are then displayed on a display device. A first characteristic of the graphic objects represents the execution time duration for the corresponding subprogram, and a second characteristic of the graphic objects represents the hierarchical relationship among the subprograms within the program.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIGS. 3A and 3B illustrates the relationship between timer subprogram calls and a timing database.

DETAILED DESCRIPTION

A system is described that facilitates the analysis of program execution and performance by measuring the execution time for portions of program code and graphically displaying the execution time on a display device. The execution time of nested program code is displayed relative to other portions of code, thus allowing a user to view the hierarchical relationship and relative timing of program code on a graphical display. For one embodiment of the present invention, the computer program, hereinafter referred to as the "performance analyzer program", includes a timer subprogram and a post-processing program. The timer subprogram times the execution for a section of code that is marked to be timed, and the post-processing program collects the timing data and transforms it into an object that can be captured and displayed by a separate graphic display program.

For the timer subprogram, timing markers are inserted into a program to be analyzed, or a portion thereof. A free-running timer measures the elapsed execution time between sets of timing markers. After the program to be analyzed is executed, timing data for program execution is derived using the measured time values. The timing data is stored in a database and transformed into appropriate function or graphical object data. The function data is used to generate a graphical representation of the program execution time, which is then displayed on a computer display device through a graphical user interface program. Program code that contains calls to other program modules, such as subroutines and program loops, is displayed in a hierarchical relationship to these lower level modules, such that a nested display of execution among various nested program modules is represented. Separate programs, each containing their own nested modules, occurring simultaneously may be displayed on the same screen.

For one embodiment of the present invention, the performance analyzer program may be written as a stand-alone program that may be invoked at the option of the user. For an alternative embodiment of the present invention, the performance analyzer program may be embedded in the system software of a computer, therefore being always available and providing non-intrusive execution by the program modules being examined.

Figure 1:
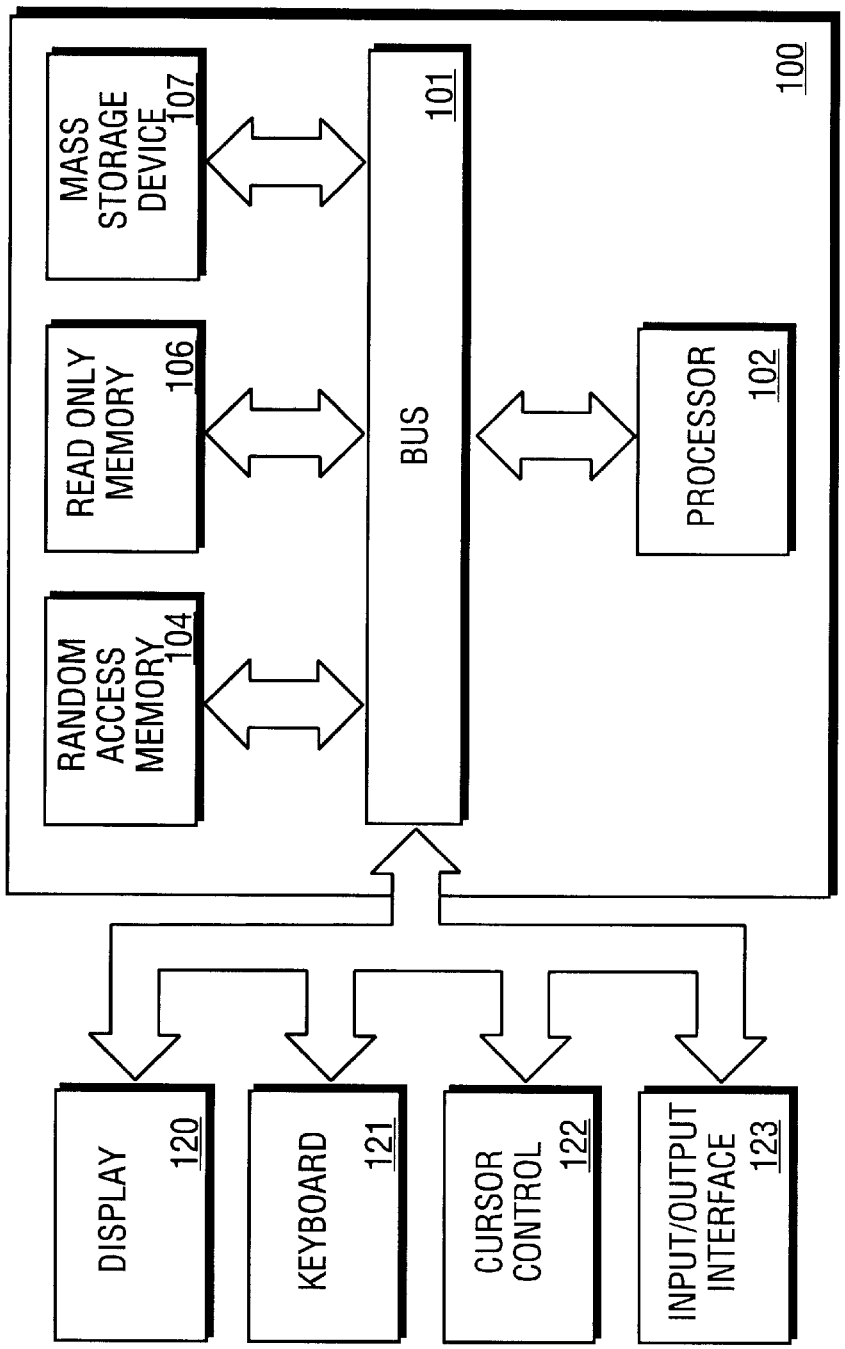
FIG. 1 is a block diagram of a computer system containing several components linked by a bus.

FIG. 1 is a block diagram of a representative computer system that may be used to implement the performance analyzer program. The computer system 100 includes a processor 102 coupled through a bus 101 to a random access memory (RAM) 104, a read only memory (ROM) 106, and a mass storage device 107. Mass storage device 107 could be a disk or tape drive for storing data and instructions. A display device 120 for providing visual output is also coupled to processor 102 through bus 101. Keyboard 121 is coupled to bus 101 for communicating information and command selections from the user to processor 102. Another type of user input device is cursor control unit 122, which may be a device such as a mouse or trackball, for communicating direction commands that control cursor movement on display 120. Also coupled to processor 102 through bus 101 is an input/output (I/O) interface 123, which can be used to control and transfer data to electronic devices connected to computer 100.

In one implementation, the performance analyzer program is used in a computer system that is configured to test semiconductor devices or device assemblies, and the performance analyzer program is intended to be used to analyze the performance of test programs written specifically to perform these tests. For this implementation, I/O interface 123 may be connected to a test circuit or test head. More than one I/O interface such as I/O interface 123 may be provided for testing more than one device at a time.

It is to be noted that the architecture of FIG. 1 is provided only for purposes of illustration, and that a computer system used in conjunction with the present invention is not limited to the specific architecture shown.

Figure 2:
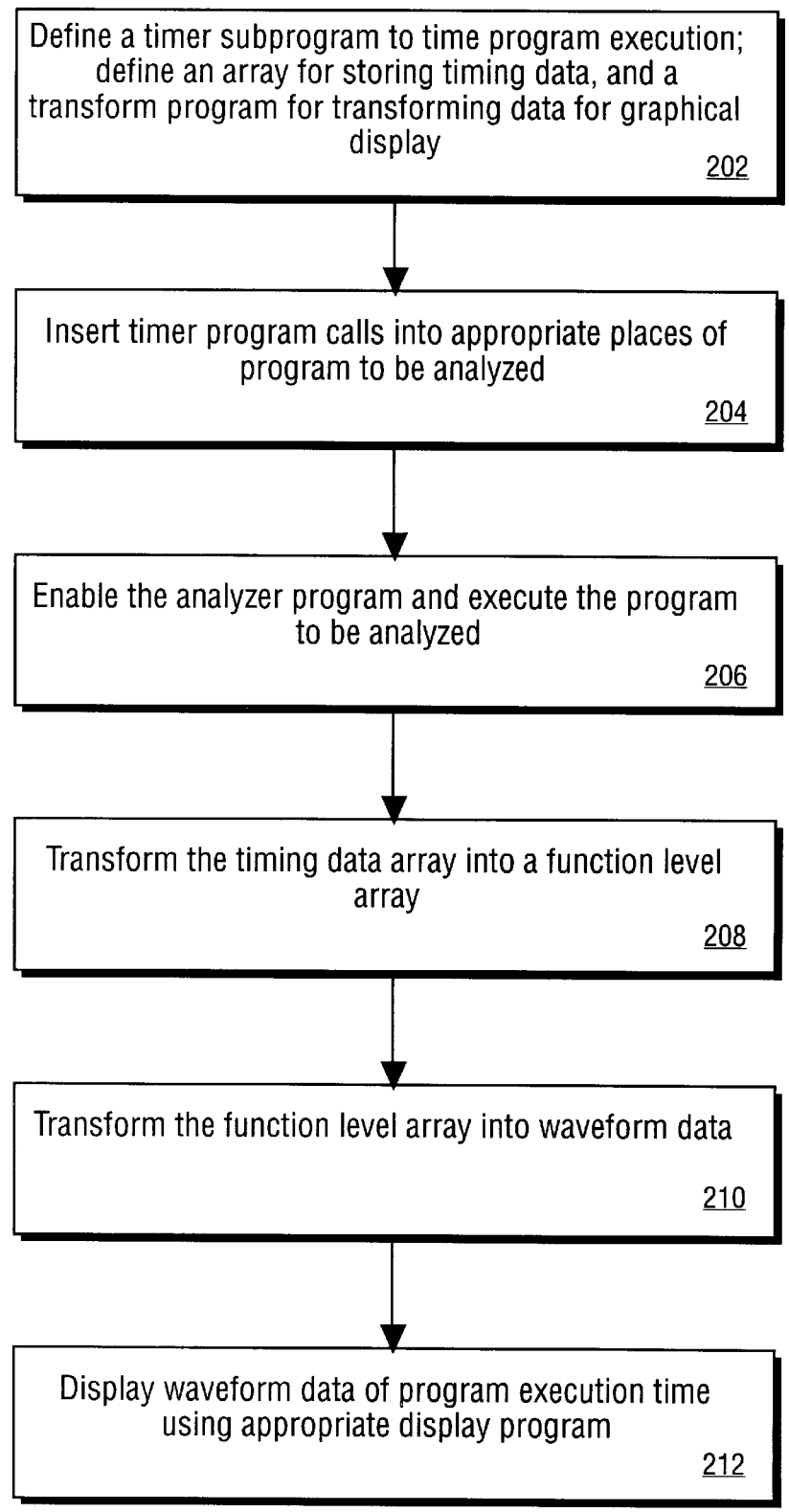
FIG. 2 is a flowchart that outlines the method steps for a program according to one embodiment of the present invention.

FIG. 2 is a flowchart that illustrates the overall process of implementing a performance analysis program according to one embodiment of the present invention. In step 202 a subprogram or subroutine for timing the duration of execution of a particular portion of code is written and defined. An array for storing the timing data generated by the timing module is also defined, as is a program module for transforming the time data from text form to a form that is suitable for display through a separate waveform display program. Calls to the timer subprogram are then inserted into appropriate places in the program to be analyzed, step 204. Once the program to be analyzed is appropriately marked with calls to the timer subprogram, the analyzer program may be enabled and the program to be analyzed may then be executed, step 206.

Once the program to be analyzed is executed, the timer module produces timing data for the portions of code demarcated by the function calls. This timing data is stored in the array defined in step 202. In step 208, this timing data is transformed from the timing data array into a function level array. The function level array provides an intermediate form for the timing data for ultimate display in a graphical representation. Thus, in step 210, the function level array representation of the timing data is transformed into waveform data that is suitable for manipulation by a waveform display program. In step 212, the waveform data is displayed using a program that is capable of displaying the waveform data generated in step 210.

Each of the steps illustrated in FIG. 2 will be described in detail in the discussion that follows. For one embodiment, the steps of the present invention are embodied in machine-executable instructions. The instructions can be used to cause a general-purpose or special-purpose processor that is programmed with the instructions to perform the required steps. Alternatively, the steps of an embodiment of the present invention may be performed by specific hardware components that contain hardwired logic for performing the steps, or by any combination of programmed computer components and custom hardware components.

Region Timer Module

As shown in step 202 of FIG. 2, a timer subprogram to time program execution is first defined. For one embodiment of the present invention, the timer subprogram is implemented as a C++ class, hereinafter referred to as "Region_Timer". The Region_Timer uses the C++ constructor feature to construct values of its class type. A constructor allows each object of the class to be initialized before any use is made of the object. The Region_Timer also uses the C++ destructor feature to clean up objects after their last use.

The Region_Timer's constructor records the time of the entry into a region of code, and the Region_Timer's destructor records the time of the exit from the region. A member function called set_event( ) may be used to record the time control passes a specific point in the region of code. At run-time, a large array is filled with region timer objects together with the time values that record the execution flow of the program being analyzed.

An example of a source code module written in C++ for the Region_Timer is as follows:

| Region_Timer | |
|---|---|
| my_description: | String{canst} |
| my_filename: | String{const} |
| my_linenumber: | Integer |
| my_object: | Void*{const} |
| my_instance_number: | UnsignedLong |
| my_tag: | Tag Enum |
| Region_Timer( ) | |
| ~Region_Timer( ) | |
| set_event( ) | |
| enable( ) | |
| disable( ) | |
| reset( ) | |
| operator<<( ) | |

The function of the Region_Timer class is to record the time when a region of code is entered, to record the time when the region is exited, or to record the time that a specific point in the region is passed. The Region_Timer class is also used to enable and disable the performance analyzer program, and to reset the region timer list.

The three member functions "constructor", "destructor", and "set_event" correspond to the first three functions of Region_Timer class respectively. That is, Region_Timer::Region_Timer records a time when a region is entered, Region_Timer::~Region_Timer records a time when a region is exited, and Region_Timer::set_event records a time passed a specific point in the region.

An enable flag is used for enabling and disabling the timer. The region timer class has only one instance of the enable flag, and the region timer must provide a global access to the enable flag. The member variable "enable_flag" is employed as a singleton. Hence, all sub-sequences of region timer instances will have only one unique instance of enable flag. To provide global access to this unique enable_flag, the member functions "enable", "disable", and "is_enable" are incorporated to respectively set the enable flag, to reset the enable flag, and to return the value of the enable flag. Thus, Region_Timer::enable enables the performance analyzer program, Region_Timer::disable disables the performance analyzer program, and Region_Timer::is_enable checks if the performance analyzer program is enabled.

In setting and resetting the enable_flag, two inline procedures "enable_autoprofiler" and "disable_autoprofiler" are provided for easy usage without declaring the region timer object. The "is_enable_autoprofiler" is also provided for the user to easy access the enable_flag in the Region_Timer class without declaring the region timer object.

One of the tasks of the performance analyzer program is to collect the region timer information, therefore, region timer objects with their timer values are stored in a large array. The region timer class provides a member function "reset" to clean up the objects in the array for subsequent program execution, if needed. If "reset" is not called, the region timer objects from subsequent execution are appended to the array. An equivalent inline procedure "reset_autoprofiler" for the Region_Timer member function "reset" is provided. Thus, Region_Timer::reset resets the performance analyzer program.

The description of the region must not be an empty string, since this is the field to be checked if the object is empty. Thus, Region_Timer::is_empty checks if the region object is empty.

Member functions are also provided to access private data. For example, Region_Timer::dscp gets the description of the code being analyzed, Region_Timer::file gets the file name for the code being analyzed, and Region_Timer::line gets the line number. Because the Region_Timer class is an interface for the performance analyzer program, the member functions for setting private data are not declared. This serves to prevent unintentional resetting of the member data.

The Region_Timer module also provides a pretty print for the class Region—Timer using the C++ overload operator "<<". This module provides three further functions "region_timer_list", "get_starttime_autoprofiler", and "is_empty_autoprofiler". The module region_timer_list gets the region timer event list, get_starttime_autoprofiler gets the time stamp of the first region timer object in the region timer event list, and is_empty_autoprofiler checks if the region timer event list is an empty list.

The Region_Timer module also provides two procedures to print the information in the region timer array to any type of output stream. The two functions are "show_event_list" and "show_nested_level". The show_event_list module performs a pretty print of the region timer event list as a sequence of event occurrences, and show_nested_level performs a pretty print of the region timer object in the region timer event list as a function of program nesting. If the start and stop times are supplied, both functions will print out only those region timer objects that are within the time frame given.

For one embodiment of the present invention the Region Timer class is implemented as a C++ inline function. An inline function indicates to the compiler that inline substitution of the function body is preferred over the usual function call implementation. In the context of the performance analyzer program, the use of an inline function for the Region Timer class helps to minimize the performance overhead incurred by including Region Timer calls in the program. An example of the Region Timer class written in C++ is as follows:

```
class Region_Timer { public:
  RegionTimer(const char*descr,BaseSymbol*ptr,const char*file,int line) :
        object_ptr ( ptr )
    {
    if (enable_flag)
        GetNextEventPointer( )->SetEvent(descr,ptr,file,line,Enter);
    };
  ~RegionTimer( ) {
        if (enable_flag)
        GetNextEventPointer( )->SetEvent (" ",object_ptr, 0, 0, Exit);
    };
  void set_event (const char*descr, const char*file, int line) {
        if (enable_flag)
        GetNextEventPointer( )->SetEvent(descr,object_ptr, file;
        line, Event);
    };
  private
        RT_Event* GetNextEventPointer( );*
        static int enable_flag; // 0 disables, 1 is enabled
        BaseSymbol *object_ptr;
    };
```

For one embodiment of the present invention, the performance analyzer program may be available as a stand-alone program that may be invoked at the option of the user or within another program. Alternatively, the performance analyzer program may be embedded in the system software of a computer, therefore being always available.

For implementation within another program or the system software, the Region Timer includes a base class, referred to as "BaseSymbol". Classes within other programs, such as the system software, which use the performance analyzer program may be derived from the BaseSymbol class. The use of such a base class allows the definition of certain data and certain functionality in this base class, such that all of the derived classes inherit these attributes. This allows the performance analyzer program to get information from an object without requiring knowledge of the specifics of each class within the other programs.

Inserting Region Timer Module into Code

As illustrated in the flow chart of FIG. 2, step 204 involves inserting timer subprogram calls into appropriate places of the program to be analyzed. For one embodiment of the present invention, the performance analyzer program is invoked by placing calls to the Region_Timer module defined above. The following code segment is one example written in C++ of how the performance analyzer may be inserted into a program to be analyzed:

```
#include <Profiler/Region_Timer.hxx>
SomeClass::execute( )
{
    Region_Timer rt ( "execute", _FILE_, _LINE_, this );
    . . . // existing code
    rt.set_event ( "closing relays", _FILE_, _LINE_ );
    . . . // more existing code
}
```

In the portion of code provided above, "Region_Timer" is the class name specifying the interface for the program analyzer program, and "execute" is a programmer supplied string that will be displayed on the time line displayed on the display device. This string will be prepended with the class and object name as found via the "this" pointer. The "this" pointer is passed on as an object derived from BaseSymbol. When Region_Timer is used in other situations, a "0" should be passed instead.

The constructor will identify the time when SomeClass::execute is entered. The destructor identifies when that region is exited. Any number of set_event( ) functions may be added to measure specific program instances and to further annotate the time line. The ____FILE____ and ____LINE____ are normally not propagated onto the time-line object. However, they may be propagated if selected by a user controllable option. The C++ compiler will substitute a string containing the source file name for ____FILE____. Similarly, the compiler will substitute the line number, as an integer, for ____LINE____.

It should be noted that all of arguments passed to either the Region_Timer's constructor or the Region_Timer's set_event( ) function are kept as a pointer copy until those data are processed into a time-line object. This avoids object copies and string copies which will add performance overhead.

The next code segment is a second example of how the performance analyzer may be inserted into a program to be analyzed:

```
#include <Profiler/Region_Timer.hxx>
SomeOtherClass::execute( )
{
Region_Timer rt1 ("execute", _FILE_, _LINE_, 0);
. . . // existing code
for ( int i = 0; i < MAX; i++ )
{
    Region_Timer rt2 ("execute:for loop", _FILE_, _LINE_, 0);
    . . . // more existing code
    rt1.set_event ( "closing relays", _FILE_, _LINE_);
}
    . . . // more existing code
}
```

In this example, the member function set_event( ) is being called from the first Region_Timer object, rt1. This will cause the occurrence of the event "closing relays" to be displayed relative to the first object, rt1, and not rt2. It should also be noted that set_event does not get called for rt2.

As described above, the Region_Timer class that comprises the performance analyzer program contains a constructor which records the time of entry into a region of code, a destructor which records the time of exit from that region of code, and a function (set_event) which can record the time that a specific point in the region is passed. Thus, execution of the performance analyzer program may generate a substantial amount of timing information. According to one embodiment of the present invention, at run-time, a large array is filled with region timer objects together with the time values that record the execution flow. The region timer objects are stored in an array referred to as the "region timer event list".

It should be noted that constructor, destructor, and set-event functions of the Region_Timer class will operate as described only if the enable_flag variable (shown in the Region Timer class example provided above) is true. In one embodiment of the present invention, the enable_flag variable is set by the user through a graphical user interface option box. For example, a START button on the user interface sets enable_flag true, and a STOP button sets enable_flag false. The enable_flag variable and the constructor, destructor, and set-event functions of the Region_Timer class can be coded so that performance overhead is minimal when enable_flag is false. That is, they can be optimized for minimal impact when turned off, so that instrumented, but disabled programs are not slowed down.

Figure 3B:
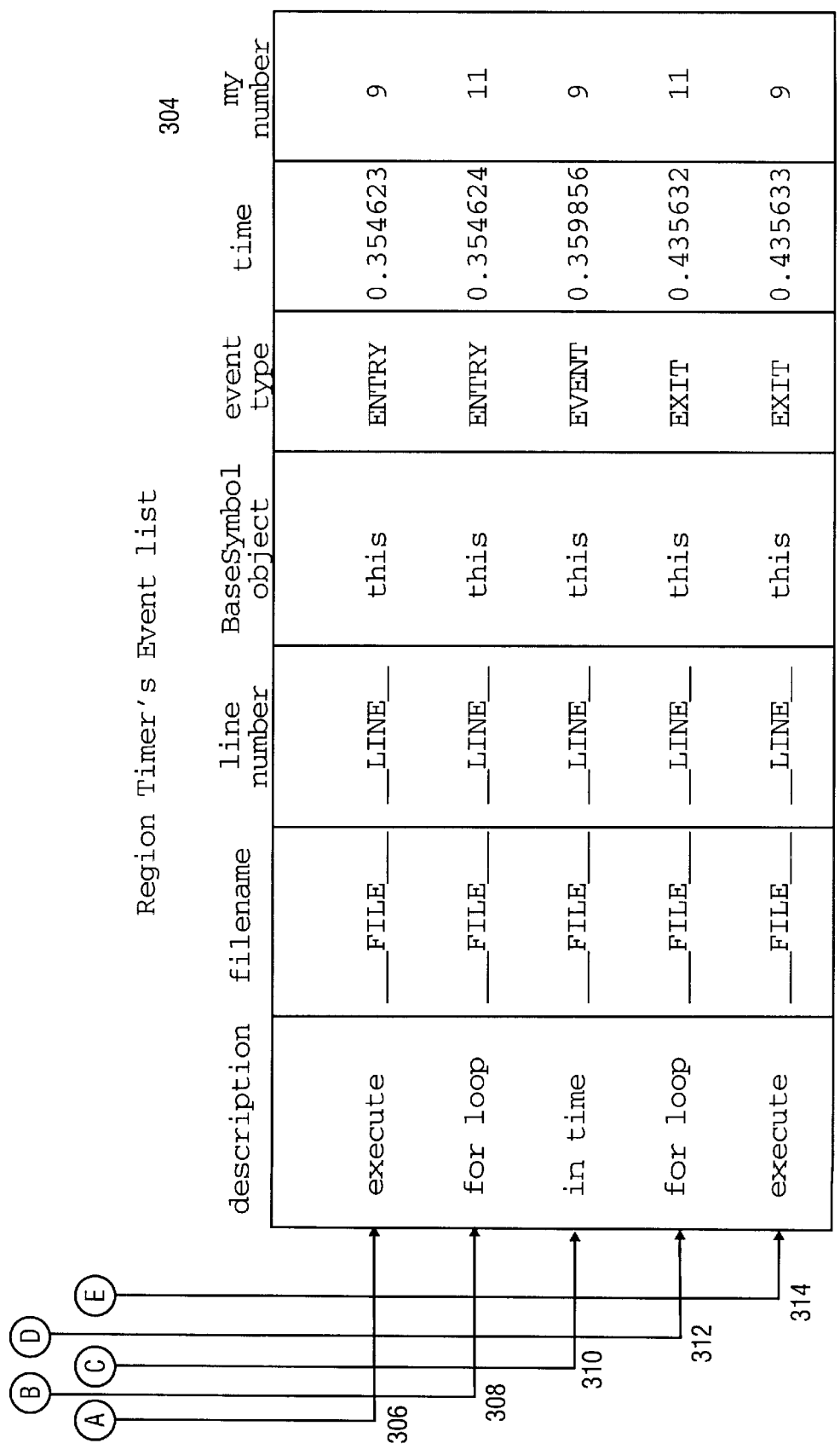

FIGS. 3A and 3B comprise a diagram illustrating the operation of the performance analyzer program in relation to a portion of a program to be analyzed. Thus FIG. 3A and 4B effectively represent the sequence of events that occur when a user enables the performance analyzer program and executes the program to be analyzed, as shown in step 206 of FIG. 2. FIGS. 3A and 3B contain a portion of code 302 containing region timer function constructors and destructors and set_event function calls, and a table 304 representing a region timer event list.

As shown in FIGS. 3A and 3B, the code line "Region_Timer rt1 ("execute", FILE____, ____LINE____, 0);" results in the entry in table 304 of line 306 which marks the entry into a first portion of code as occurring at time 0.354623. The codeline "Region_Timer rt2 ("for loop", ____FILE____, ____LINE____, 0);" results in the entry of line 308 which marks the entry into a second portion of code as occurring at nearly the same time 0.354624. The code line "rt1.set_event ("in time", ____FILE____, ____LINE____);" results in the entry of line 310 which marks the event labeled "in time" as occurring at time 0.359856. When the destructor for region timer rt2 is called, line 312 is entered into the region timer event list. Line 312 indicates that the portion of code labeled "for loop" was exited at time 0.435632. Likewise, when the destructor for region timer rt1 is called, line 314 is entered into the region timer event list. Line 314 indicates that the portion of code labeled "execute" was exited at time 0.435633.

FIGS. 3A and 3B illustrate the region timer event list as a table. An example of the Region_Timer module in C++ code that defines a region timer event list is as follows:

```
class Region_Timer
{
  private:
    // tag indicating the type of the object the user supplied.
    // This is used to create an appropriate Region_Info when
    // storing into the region timer event list.
    enum tag_enum { UNKNOWN, ETIC, SYMBOL, EXPR };
    const char*     my_description;      // description for
                                          region
    const char*     my_filename;          // filename for region
    int             my_linenumber;        // linenumber for
                                          region
    const void*     my_object;            // object for region
    unsigned long   my_instance_number;   // instance no. of
                                          region
```

-continued

```
    tag_enum        my_tag;               // tag for type of
                                          object
    // FALSE means disabled, TRUE means enabled
    static boolean  my_unique_enable_flag;
    // number of instances created altogether
    static unsigned long    my_total_instance_number;
};
```

The region timer objects illustrated above are constructed as an instance of type Region_Info, to be stored in the "region timer event list" array. The instance number is used to differentiate construction of either a waveform data object or the printing of the region timer event list.

A SINGLE region timer event list is maintained for an entire test-program execution. This region timer event list is a large collection of records. An example of the record written in C++ is as follows:

```
class Region_Info
{
  public:
    enum event_enum { UNKNOWN, ENTER, EVENT, EXIT };
  private:
    const char*     my_description;      // description for
                                          region
    const char*     my_filename;         // filename for the
                                          region
    int             my_linenumber;       // linenumber for
                                          region
    const void*     my_object;           // object for region
    event_enum      my_event_type;       // type of event
    RT_Timer        my_event_time;       // time stamp
    unsigned long   my_instance_number;  // instance number
                                          when created
};
```

The region timer event list consists of a linked list of a fix-sized array of Region_Info. These arrays, referred to as "nodes" represent data structures for the storage of data entries. When data is generated and saved by a dynamic process such as the performance analyzer program, it is not always known beforehand how much data will be generated. In such a case, allocating memory as the program runs is expensive in terms of memory usage, and not necessarily repeatable from one execution sequence to another. Instead, a method of an embodiment of the present invention uses nodes to minimize memory allocation at runtime. The use of nodes allows for the dynamic allocation of discrete blocks of pre-sized memory. At the start of program execution, one or more nodes are allocated. Each node is capable of storing a set number of events. If a particular node is filled, another node is used. If the program is run more than once, previously allocated nodes remain allocated. Thus, new arrays are allocated, if needed, at run-time, and data from subsequent execution of the program can either be appended to previously allocated arrays or reuse the previously allocated arrays. The creation of the region timer event list arrays, as described above, occurs at run-time during the execution of the program to be analyzed, i.e., step 206 in FIG. 2.

Figure 4:
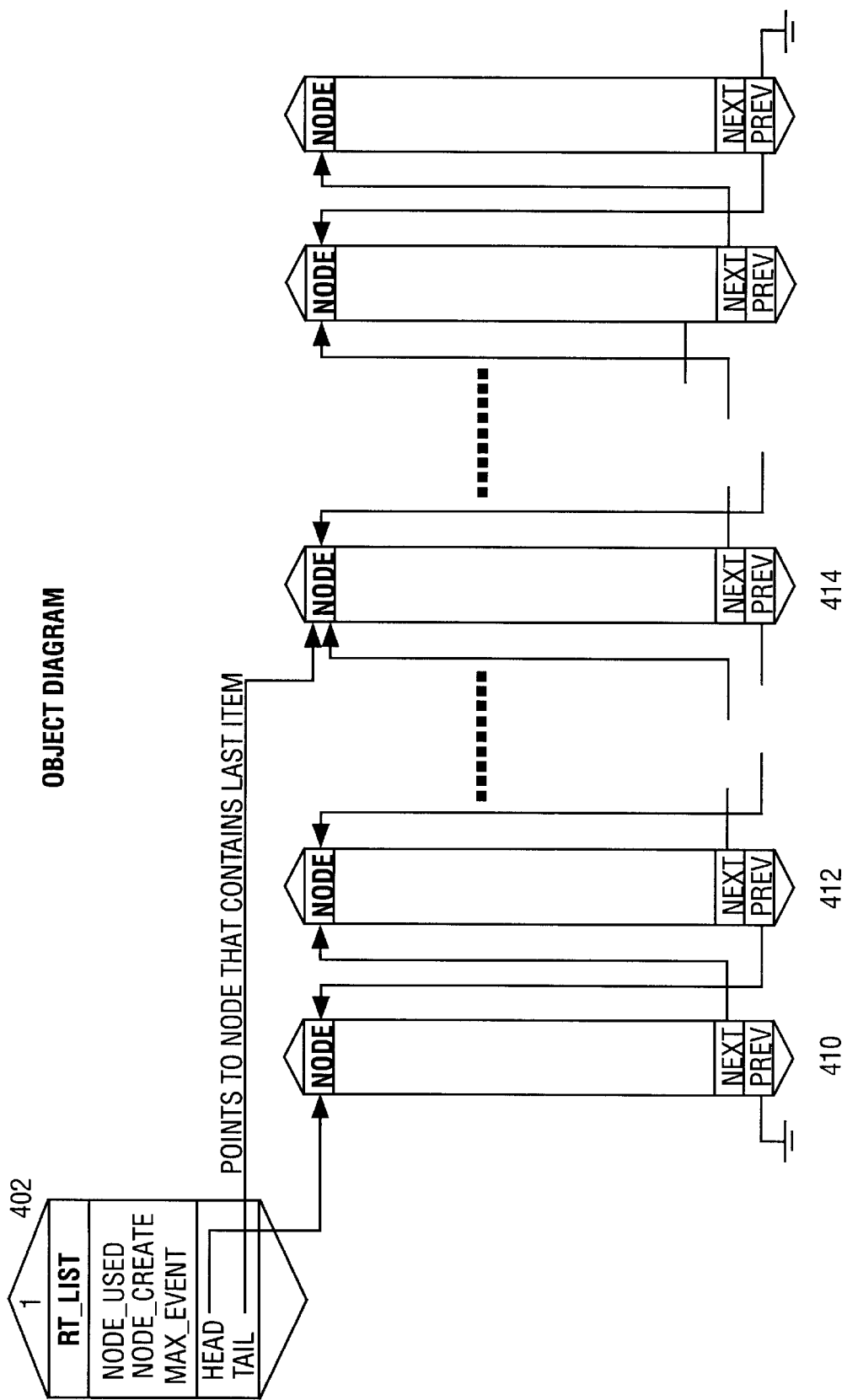
FIG. 4 is a block diagram of the linked relationship between memory arrays and the timing database.

FIG. 4 illustrates an object diagram of the region timer event list. RT_List 402 corresponds to a table, such as table 304 in FIG. 3. The head entry points to the first entry for a node which contains the first item. The first node 410 specifies the first entry for the next node 412. This next node 412, in turn specifies the first entry for the next node, and so on. RT_List also contains a tail entry which points to the node 414 that contains the last item.

In certain instances, such as that illustrated in FIG. 4, the function RT_List::my_tail is not pointed to the last node of the list. In this case, RT_List::my nodes_create is implemented to keep track of how many nodes have been created, and RT_List::my_nodes_used is for keeping track of how many nodes have been used. Examples of C++ classes defined for the RT nodes is provided as follows:

```
class RT_Node
{
  private:
    unsigned int   my_total usage;                // #items in array are used
    Region_Info    my_info[ MAX_REGION_STORAGE ];
    RT_Node*       my_rev_ptr;
    RT_Node*       my_next_ptr;
};
class RT_List
{
  private:
    unsigned int   my_nodes_used;      // #nodes in the list are used
    unsigned int   my_nodes_create;    // #nodes created in the list
    unsigned int   my_max_events;      // max #events wanted
    RT_Node*       my_head;            // head of the list
    RT_Node*       my_tail:            // tail for last_item
};
```

Figure 5:
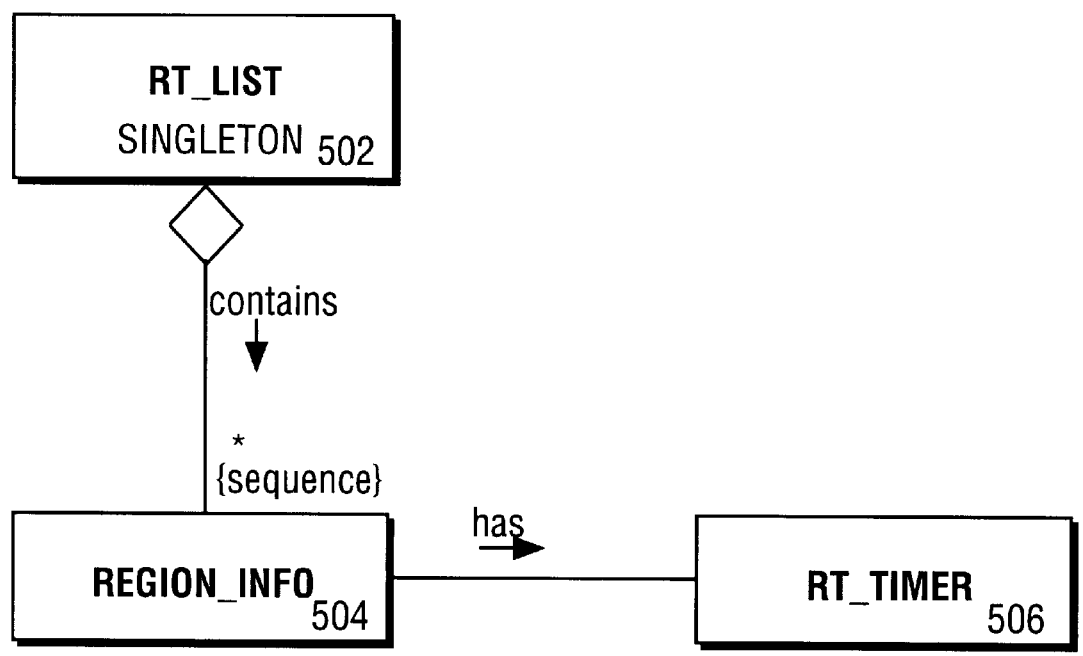
FIG. 5 is a block diagram illustrating the relationship among the classes of objects within the timer program.

FIG. 5 is a class diagram that illustrates the structure of the region timer event list. The Region Timer list 502 contains a Region_Info object 504 which has the RT_Timer function 506.

Post-processing The post-processing portion of the performance analyzer program consists of two parts. The first part is the transformation of the region timer array into a function level array. The second portion is the transformation of the function level array into a waveform datalog. The waveform datalog is used by a waveform capture and display program for displaying waveforms representing the time data on a computer display
Transformation Module As illustrated in step 202 of FIG. 2, timing data is stored in an array once the program to be analyzed is executed. The timing data is the data produced by the timer module for the portions of code demarcated by the timer function calls. A timed event list is maintained for the entire execution cycle of the program to be analyzed. For one embodiment of the present invention, the event list is a large collection of C++ language structures (structs). In C++, a structure is an aggregate of elements of arbitrary types. An example of an event list structure that may be used for the performance analyzer program is as follows:

```
struct RT_Event {
const char* description;
const char* file;
int line;
BaseSymbol *object;
double event_time;
enum event_type_enum {Unknown, Enter, Event, Exit} event_type;
}
```

The event list consists of a linked list of RT_Event_arrays. New arrays are allocated, if needed, at run-time. Subsequent execution of the program to by analyzed can reuse previously allocated arrays. The RT_Event_arrays reside in the virtual memory of the Ev_exec process (i.e., not in shared memory). An example of C++ code for an RT_Event_array structure is as follows:

```
struct RT_Event_array {
    RT_Event_array *next, *previous;
    int physical array_size; // number of elements in array
    int elements_used; // how many elements in array are used
    RT_Event *array;
    };
```

As illustrated in step 208 of FIG. 2, the timing data is transformed from the timing data array into a function level array. The function level array provides an intermediate form the timing data for ultimate display in a graphical representation. For one embodiment of the present invention, the performance analyzer program uses the display capabilities of the a waveform display program to show a time-line of the test-program activity, allowing the user to visualize the full sequence of the test program. The time-line of the test-program activity is referred to as "time-line object".

Figure 6:
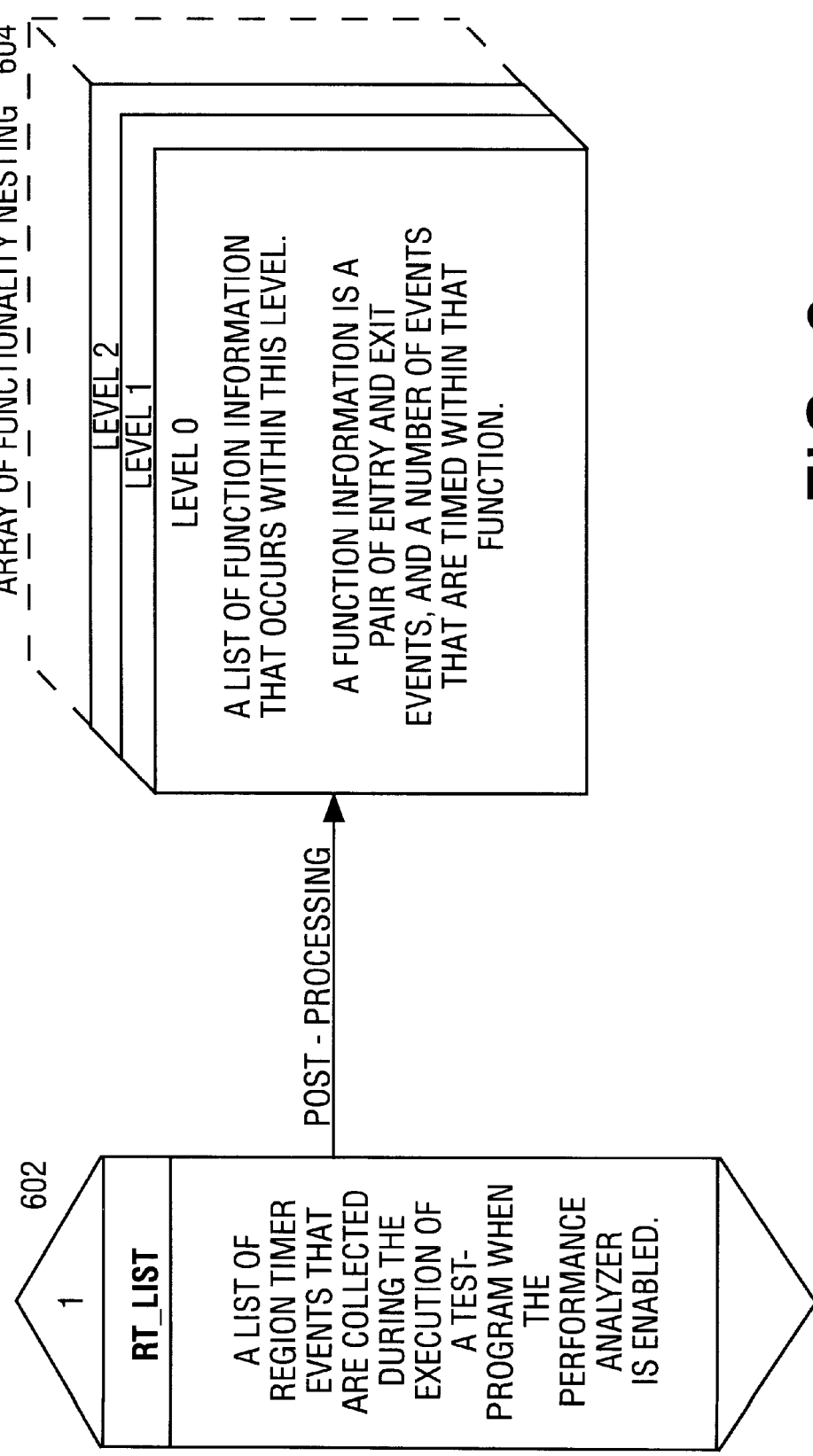
FIG. 6 is a block diagram representing the relationship between the timing database and a function array database.

During post-processing, the Region_Timer objects in the region timer list are reorganized and stored into an array of functionality nesting. Each functionality level contains a list of Region_Timer objects which occurred in a particular level. FIG. 6 illustrates the relationship between the RT_List entries and the array entries for functionality nesting during the post-processing step. The RT_List is a list of region timer events that are collected during the execution of a portion of a program to be analyzed when the performance analyzer program is enabled. This is illustrated in FIG. 6 as block 602, and corresponds to a database or array of timing data, such as table table 304 in FIG. 3B. During post-processing, this list is transformed into an array of functionally nested lists represented in FIG. 6 as block 604. Each level in block 604 corresponds to a different hierarchical section of code, with higher numbered levels nested within each preceding level. Thus, level 2 represents a portion of code nested within level 1, and level 1 represents a portion of code nested within level 0. Each level contains a list of function information that occurs within that level. A function information is a pair of ENTRY and EXIT events, and any number of events may be timed within that function.

Figure 7:
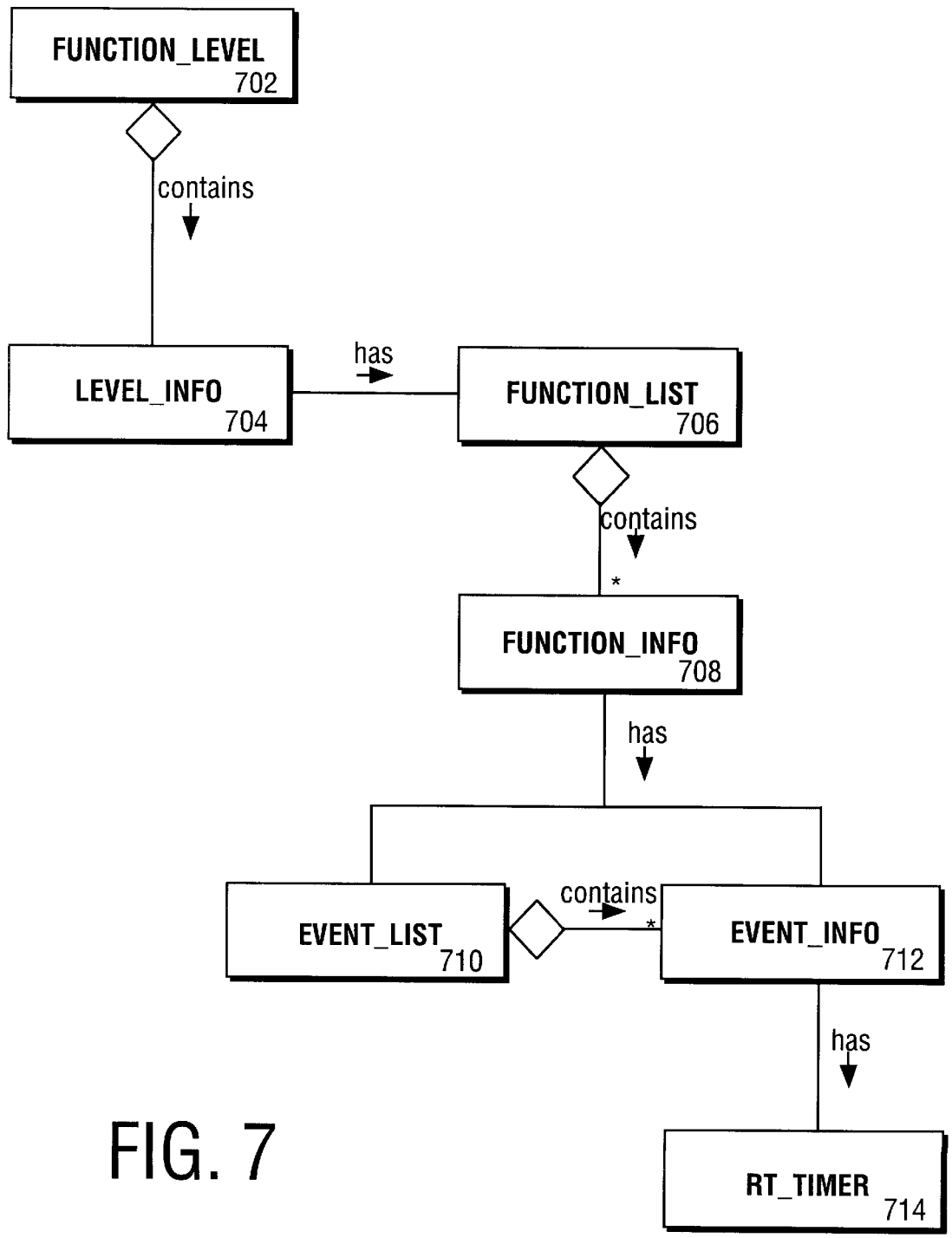
FIG. 7 is a block diagram illustrating the relationship among the classes of objects in the timing database and the function array database.

The functionality nesting array 604 is also a large collection records. FIG. 7 is a block diagram illustration of the relationships among the various classes and objects relating to these records. The Function_Level class contains the Level_Info class 704. An example of a record within the Level_Info class in C++ is as follows:

```
class Level_Info
{
    private:
        Function_List*   my_function;
};
```

The Level_Info class 704 has Function_List 706 which consists of a linked list of Function_Info 708. The class Function—Info 708 contains one ENTRY event, one EXIT event, and any number of EVENT events of that region, i.e. one region of code being measured. An example of this class is as follows:

```
class Function_Info
{
    private:
        const Region_Info*   my_info;     //  for ENTRY & EXIT event
        RT_Timer             my_time;     //  time for ENTRY & EXIT
                                          //  event
        Event_List*          my_events;   //  any EVENT events
};
```

The function Function_Info::my_time is used to keep track of start and stop time of ENTRY and EXIT event, since the class keeps a constant pointer of Region_Info 504. The Event_List class 710 consists of a linked list of Region_Info 504. Both Event_List 710 and Function_Info 708 keep a constant pointer of Region_Info because of the derived classes of Region_Info 504. Both the Region_Info 504 and the Event_Info class 712 has an RT_Timer instance 714.

For one embodiment of the present invention, the functionality nesting array 604, illustrated in FIG. 6 is transformed into a waveform data object for display through a waveform capture program, as illustrated in step 210 of FIG. 2. For each level within the functionality nesting array, all events in the Function_List 706 are posted into a stream of that level in the waveform data log.

The portions of code illustrated with regard to specific embodiments of the present invention have been written and provided as C++ language modules. It will be apparent to those of ordinary skill in the art, however, that any other suitable computer language may be used, and that embodiments of the present invention is not limited to the particular language and syntax illustrated.

Display Output

At run-time, the performance analyzer program compiles an array of timing data for the program modules within the code to be analyzed. This timing data array is transformed into a function level array, as illustrated in step 208 of FIG. 2. This function level array is then transformed into waveform data, as shown in step 210 of FIG. 2, by the transformation module described above. The waveform data is then displayed using the appropriate display program.

For one embodiment of the present invention, the waveform data produced by the transformation module is used by a program that displays the time lines as waveforms similar to waveforms displayed on a logic analyzer. The display program will be hereinafter as referred to as the "waveform display tool". The waveform display tool displays the profile of one or more threads of execution. For any thread of execution, the time-line object shows linear time (X dimension) versus functionality nesting (Y dimension). The functionality nesting represents the object execution structure of the program being analyzed.

Functionality of a subroutine is normally shown in boxes. Each box may be of any length, with the length indicating the duration of the function. Each box resides in a single row (no box spans rows). Depending on the display environment, the boxes may be displayed in various ways. Boxes may be gray-scaled or filled, or displayed in different colors to aid in visually distinguishing one box from adjacent boxes. Function nesting (subroutine hierarchy) is shown vertically from top down. The upper most row of boxes represent the highest level of functionality or rank. Below any box may be one or more boxes in the next row. These lower boxes represent functionality that is a sub-function of the box above it. Due to the nature of nesting, each lower box is directly under a single box in the immediately higher row (no lower box can span multiple upper-level boxes). Although the top row is fixed, there is no conceptual limit to how deep the nesting can go. The top row is numbered "1", and each subsequent (nested) row is given an increasing number.

The beginning of the box indicates the time at which the subroutine was entered, and the end of the box indicates the time at which the subroutine was exited. Any boxes directly below a sub-routine indicate nested subroutines.

Internal to any box may be any number (including zero) of marker events. A marker event is simply an instantaneous marker the indicates when an event happened. The marker event is shown in the box of the function that "noticed" the event.

The beginning and end of each box are also represented by events ("begin events" and "end events"). The waveform display tool is passed a data structure that lists all events for each row. The data structure lists all events (in time sequence) for row #1, then all the events for row #2, etc. Each event is represented by a data structure with the following elements: event type (such as begin, marker, or end), event time, event description (any user specified name), and location (file name and line number of the source code where the event was programmed).

Multiple subroutines and nested programs can be displayed for a single thread of execution. An embodiment of the present invention also allows the display of multiple threads of execution. Each thread of execution corresponds to a separate program. These separate programs could represent different programs running on different processors within the computer system, or different programs or processes running on the same processor. If these different programs can be executed concurrently, they will be displayed on the time line as occurring concurrently. If more than one execution thread is shown, the second execution thread is displayed as another row, below the last (highest numbered) row of the first execution thread. The first row of the second execution thread can also be numbered "1" or it can be labeled with a distinguishing number (e.g., B1). Any number of execution threads can be shown in this manner. Concurrent execution threads are all shown along the same time (horizontal) axis, implying a common time-base.

For one embodiment of the present invention, the common time-base is produced by sharing the same clock among the different threads. However, in cases where it is not feasible for the different threads to share the same clock, two clocks may be used. However, the use of two clocks requires critical synchronization mechanisms to ensure that relative time between the clocks is maintained. For example, if two clocks each with +/− 50 ppm accuracy are used, significant error may accumulate over the course of a performance profile. One method of synchronization is a software technique wherein the clocks are correlated at the beginning (i.e. recording both clocks at the same time) of a profile period and at the end of the profile period. One clock is then corrected relative to the other, using the $y=mx+b$ relationship. It does not matter which clock is chosen as the reference clock, since correlation between the clocks is more important than overall accuracy.

The primary user model of the display produced by the waveform display tool consists of a number of simultaneous time-lines. The various time-lines show different concurrent activities. After examining the time-line, the user may choose to make some modifications to the program being analyzed and then re-execute the program. In re-executing the test-program, the users can either append the current test-program performance to the previous performance, or reset so only the current program performance is shown.

Figure 8:
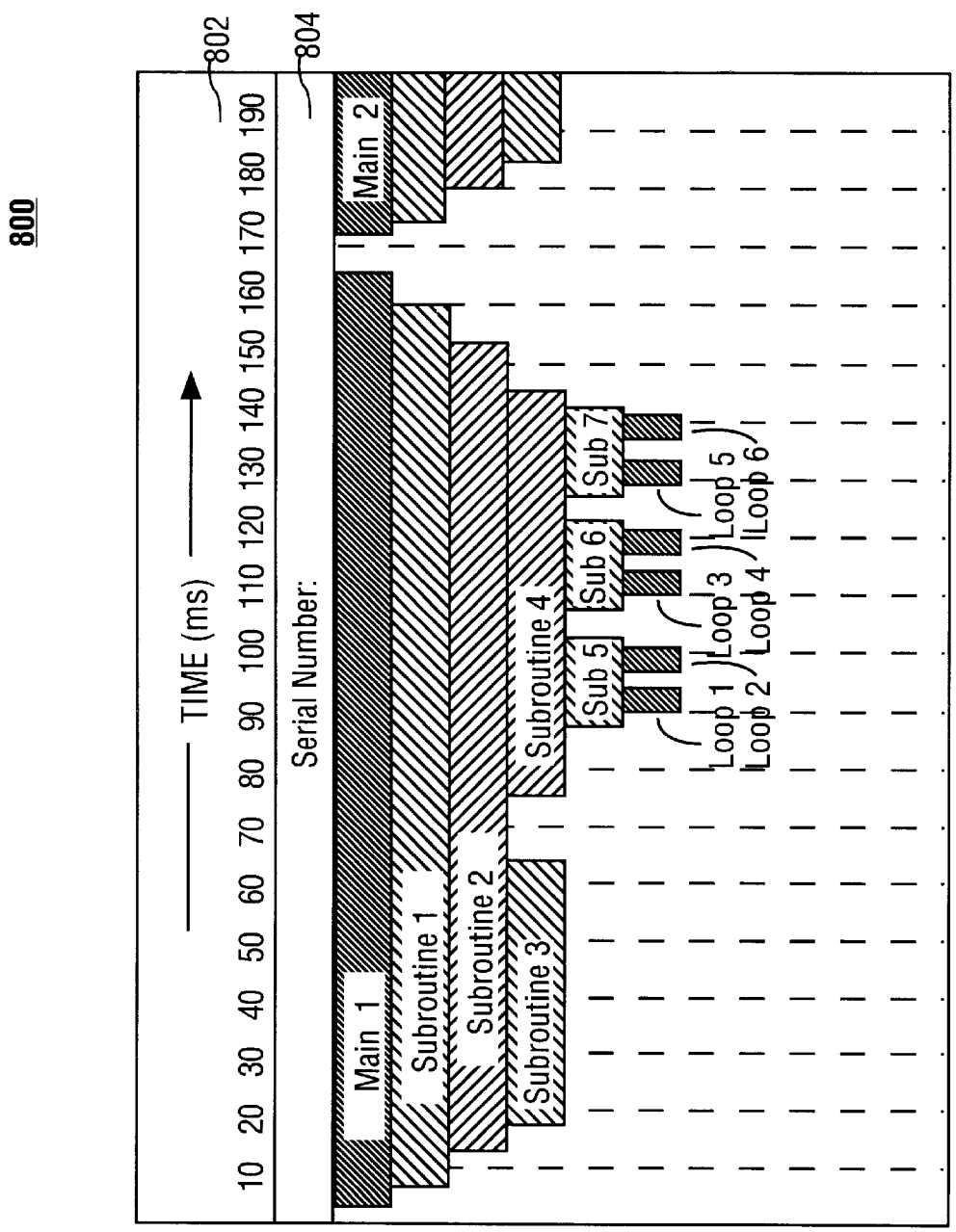
FIG. 8 illustrates the waveform display output for a single thread of execution for one embodiment of the present invention.

FIG. 8 illustrates a simplified example of graphic timeline generated by the performance analyzer program and the waveform display tool. A timeline 802 is displayed across the top of the display window 800. A serial number field 804 provides for identification of the exact execution instance. As shown in FIG. 8, a waveform object named "Main 1" representing a thread of execution for a main program was called about 5 ms into execution and continues beyond for about 165 ms. The Main 1 program calls a subprogram "Subroutine 1" which calls a second subprogram "Subroutine 2". Subroutine 2 first invokes a subprogram "Subroutine 3", which executes for about 45 ms. Subroutine 2 then invokes another subprogram "Subroutine 4" which executes for about 70 ms. Subroutine 4 calls three subprograms "Sub 5", "Sub 6", and "Sub 7", each of which execute for about 13 ms with 3 ms intervals in between. Each of these subprograms called by Subroutine 4 execute two program loops each. Loops 1 and 2 are called by Sub 5, Loops 3 and 4 are called by Sub 6, and Loops 5 and 6 are called by Sub 7. Each loop executes for approximately 4 ms.

After Main 1 executes, a second program ("Main 2") within the same thread of execution commences. The Main 2 program itself calls a subroutine, which in turn calls a second subroutine. As illustrated in FIG. 8, only the first 200 milliseconds of a program execution is displayed. Depending on the capabilities of the display tool, the user could scroll to the right or left to see other portions, or zoom in or out to see more or less detail.

Figure 9:
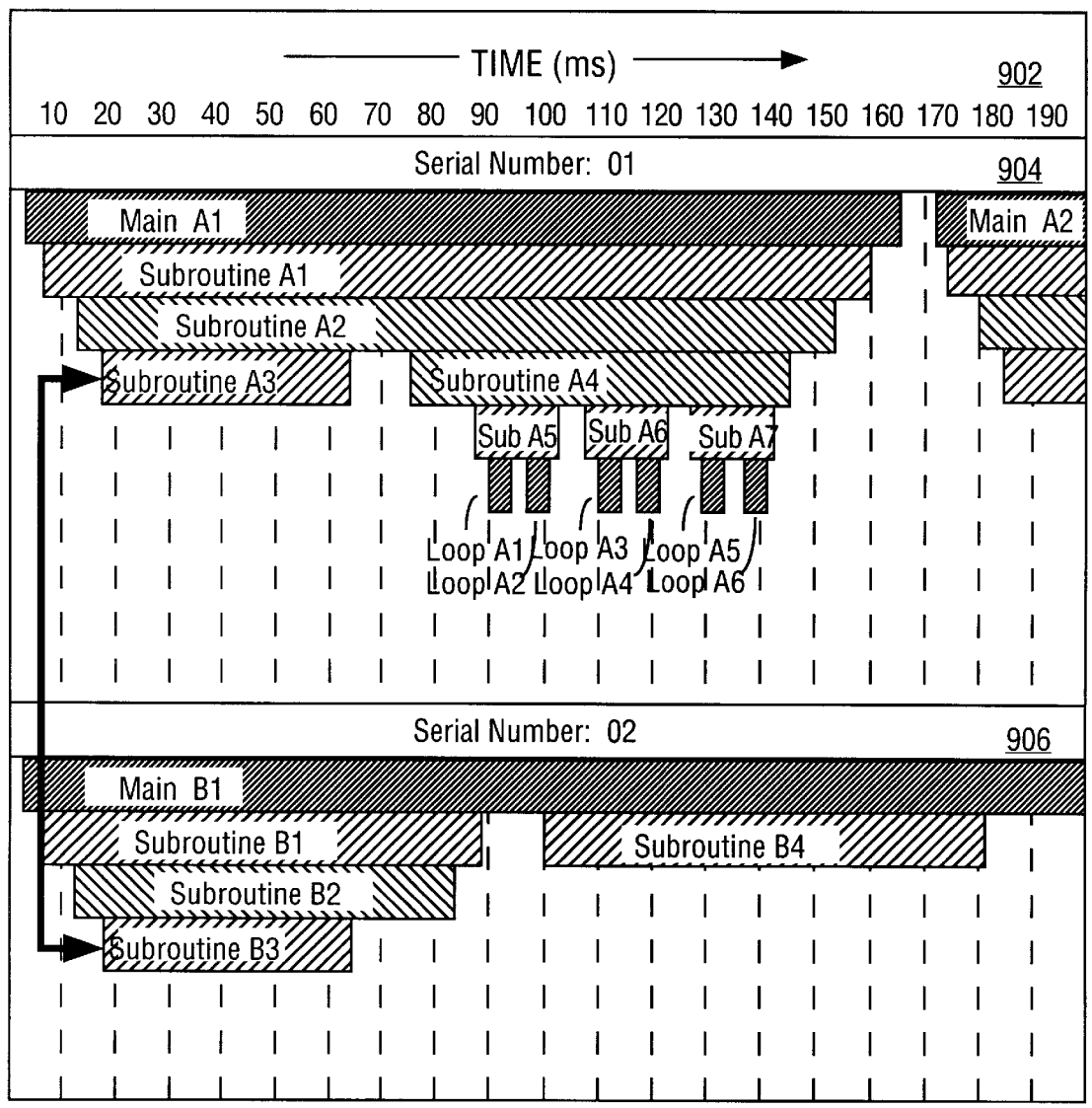
FIG. 9 illustrates the waveform display output for two threads of execution for one embodiment of the present invention.

For an alternative embodiment of the present invention, the display program may be configured such that multiple concurrent processes may be viewed on a single screen. FIG. 9 illustrates two programs or processes, Main A1 and Main B1 corresponding to two different threads of execution, displayed within display window 900. A common time-line 902 is displayed across the top of display window 900. A first serial number field 904 provided to identify the first thread of execution marks the first display region, and a second serial number field 906 provided to identify the second thread of execution marks the second display region.

The two programs Main A1 and Main A2 could represent programs executed on two different processor, or two programs executed on the same microprocessor in a time-shared manner. Nested subroutines are appropriately displayed within each of the two main programs. In the multiprocessing context, relationships between regions of code that are shared or executed by both processors, simultaneously or otherwise, may be indicated by a line linking the common portions of code, as shown in FIG. 9 as the line between subroutine A3 and subroutine B3.

The labels associated with each nested event illustrated in FIGS. 8 and 9 are specified by the user. Thus, descriptive names can be assigned and displayed with each event. For example, in one embodiment, the performance analyzer program is used in an automatic test device that tests many interactive events for the pins and circuitry of integrated circuit devices. In this case the events could be labeled with pin names and test program names.

FIGS. 8 and 9 thus illustrates how the performance analyzer program and waveform capture tool facilitate the real-time analysis of complex programs. By graphically illustrating the hierarchical relationships among programs and subprograms as nested objects relative to a common time-line, the user is able to quickly see the flow of program execution, and identify specifically where a particular process is spending an inordinate amount of time. By displaying multiple threads of execution on a common time-line, the user is able to view the synchronization among various independent programs and the demand for shared resources.

User Interface

Figure 10:
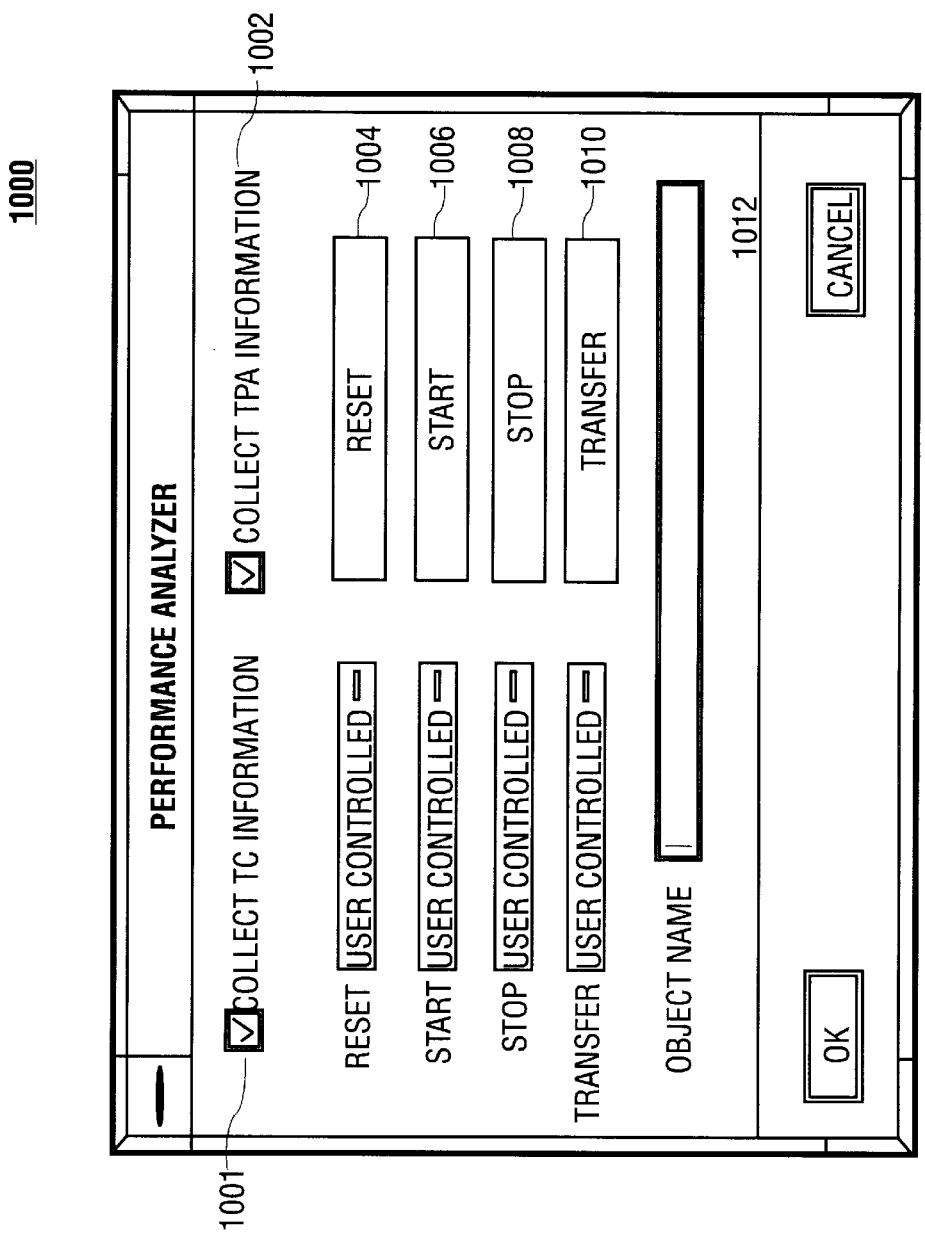
FIG. 10 illustrates the display screen for a graphical user interface that allows a user to access and configure a program for one embodiment of the present invention.

For one embodiment of the present invention, the performance analyzer program is accessible to a user through a graphical user interface program. FIG. 10 illustrates a display window that is used to access the functions provided by the performance analyzer program. The control screen 1000 contains several user selectable option buttons. These option buttons allow the user to specify system controls and program parameters that control certain aspects of the operation of the performance analyzer program.

Depending on the implementation of the performance analyzer program in the particular computer system being used, the control screen 1000 may be accessed through an operating system shell or other such program. If the performance analyzer program is implemented as part of an ATE test program, the control screen may be accessible through a pull-down menu or some other means specified by the test program.

Control screen 1000 contains several option fields. The Information Collection fields 1001, 1002 allow the user to specify which process the action of the performance analyzer program will act upon. For one embodiment, the present invention is used in an automatic test device which contains a Test Controller (TC) and a Test Process Accelerator (TPA). These are two separate computers which run concurrently and cooperatively. The Information Collection fields allow the selection of program execution data from either the Test Controller or the Test Processor Accelerator, or both.

The Reset field 1004 controls the resetting (or erasing) of the program performance data collected by the performance analyzer program (i.e., the RT_List). This function does not affect any data already transferred to the time-line object. If the Reset field 1004 is enabled, the performance analyzer program will reset both processes in field 1002. Two selection choices for Reset Field 1004 are valid, "At Execution", and "User Controlled". Selecting "At Execution" indicates that the reset will activate at the beginning of the execution of a program to be analyzed. Selecting "User Controlled" allows the user to reset the performance analyzer program whenever the "Reset" field is selected.

The Start field 1006 enables the performance analyzer program to collect the data of the test-program performance, which depends on the type of process requested. Two choices are available for the Start field 1006, "At Execution", and "User Controlled". Selecting "At Execution" indicates that the performance analyzer program will be enabled when the program to be analyzed begins execution. Selecting "User Controlled" allows the user to enable the performance analyzer program whenever the appropriate signal (e.g., depressing a keyboard "Start" button) is sent.

The Stop field 1008 allows the user to disable the program performance evaluation by the performance analyzer program. Two choices are available for the Stop field 1008, "At End of Execution" and "User Controlled". Selecting "At End of Execution" tells the performance analyzer program to disable the timer when the program stops execution. Selecting "User Controlled" allows the user to disable the performance analyzer program whenever the appropriate signal (e.g., depressing a keyboard "Stop" button) is sent.

As mentioned above, for one embodiment of the present invention, the Start field 1006 on the control screen sets the enable_flag variable in the Region_Timer class to true, so that the constructor, destructor, and set-event functions of the Region_Timer class will operate. Likewise, the Stop field 1008 sets the enable flag variable in the Region_Timer class to false, so that these functions will not operate.

The Transfer field 1010 allows the user to transfer the data of the program performance collected by the performance analyzer program into the time-line object (i.e., step 208 in FIG. 2), which can be displayed by the waveform display tool. The process in which the performance analyzer program will perform the post-processing operation depends on the selection of the Information Collection fields 1002, described above. Two choices are available for the Transfer field 1010, "At End of Execution", and "User Controlled". Selecting "At End of Execution" will activate a post-processing at the end of program execution. Selecting "User Controlled" allows the user to enable the performance analyzer program whenever the appropriate signal (e.g., depressing a keyboard "Transfer" button) is sent. The Object Name field 1012 allows the user to input the name of the time-line object. If the name is not given, an auto-generated string will be used.

For one embodiment of the present invention, the performance analyzer program is initially setup in a manual mode. The option buttons provided in control screen 1000 allow the user control when to start, when to stop, when to transfer, and when to reset the performance analyzer program. It should also be noted that the Reset, Start, Stop, and Transfer functions may be configured to be operational at all times, regardless of whether the selection choices for the respective fields indicate "At Execution" or "User Controlled". This allows the user to have more control over the analysis process.

Figure 11:
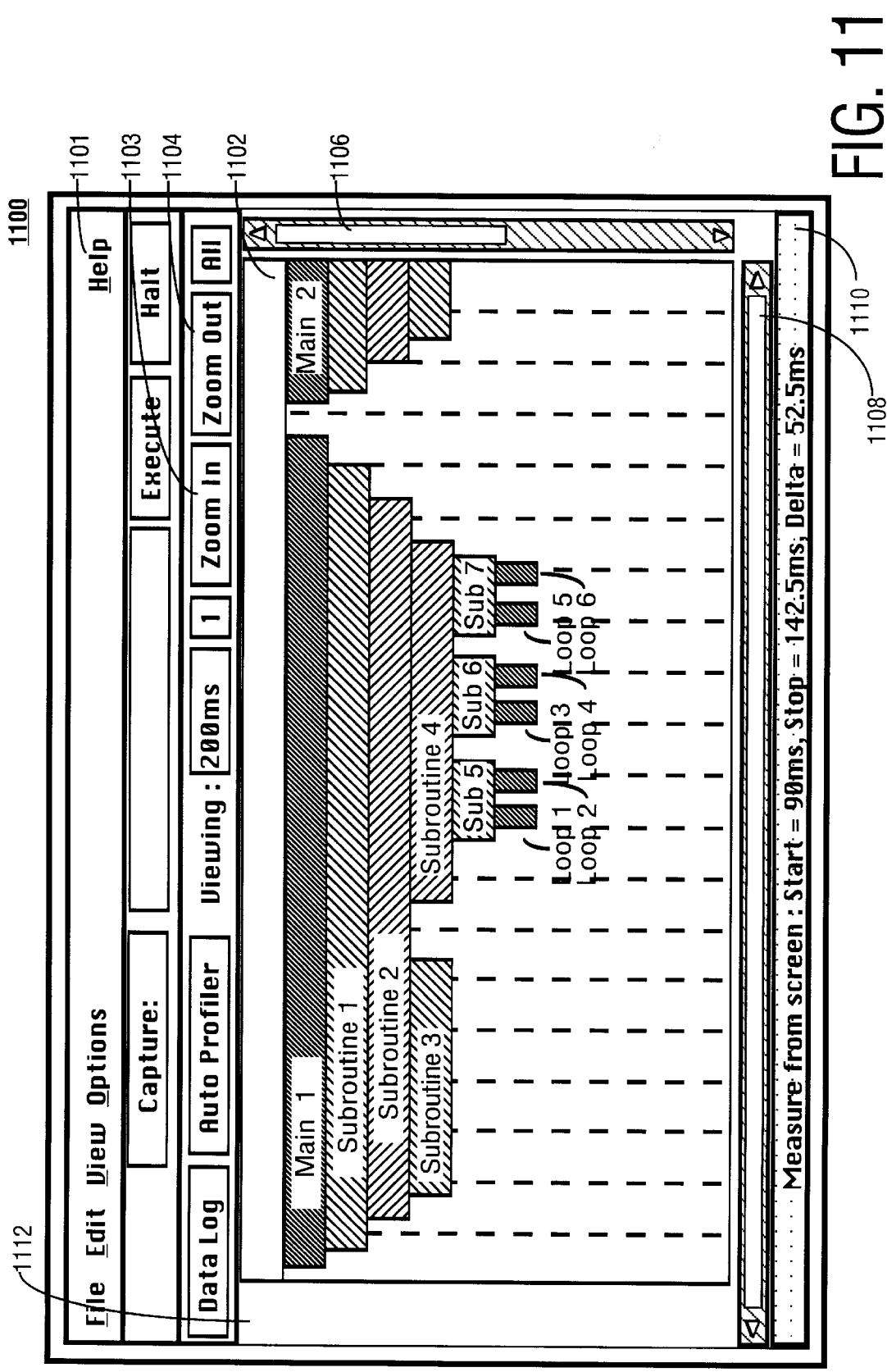
FIG. 11 illustrates the display screen for a graphical user interface that displays waveforms produced by a program for one embodiment of the present invention.

The waveform display tool creates, manipulates, and visualizes the waveform data objects transformed from the function level array data. The waveform display tool includes a display screen that presents the timing information generated by the performance analyzer program in a graphical display. The display screen also provides user access to several commands and options to examine the timing information and the timed events. FIG. 11 illustrates the display screen generated by the waveform display tool. Waveform display screen 1100 includes several different fields, option buttons, and a display window 1102. Note that the waveforms illustrated in display window 1102 correspond to FIG. 8 and are provided for the purposes of illustration.

The option buttons in the waveform display screen 1100 allow the user to control and configure the waveforms displayed in display window 1102. For example, the Zoom In option button 1103 and Zoom Out option button 1104 increase or decrease the time scale, respectively, thus effectively magnifying or shrinking the displayed waveforms and providing either greater detail or overview. The zoom feature can also be configured such that the user can zoom into a selected area. The vertical scroll bar 1106 allows the user to scroll vertically upwards or downwards to view program functionality (nested subroutines). Sequential line numbers 1112 are assigned to each nested subroutines or event. The horizontal scroll bar 1108 allows the user to scroll horizontally forwards or backwards to view different time periods along the time scale. To further modify the view area, the waveform display tool can be configured to enlarge or shrink the row height associated with the displayed boxes.

As illustrated in FIG. 11, the waveform display tool simultaneously displays event information (which can include description and location) in the boxes of all displayed events. It can also be configured to display information for a selected event on an information line 1110 at the bottom of the screen. This is useful for displaying the full event information for events that have too limited an area to accommodate a full description in the box. Information line 1110 can also be used to display information specific to a particular event, or to display information related to a screen marker. For one embodiment of the present invention, a time difference measurement for a particular event (or events) could be displayed by selecting an event with an input device (e.g., a mouse) and dragging the cursor to another event, or area within the same event. For example, the timing data provided in information line 1110 could correspond to the start and stop times between Loops A1 and A6 in FIG. 8.

For one embodiment of the present invention, the menu bar 1101 provides access to additional commands and features of the waveform display tool. The "View" and "Options" menus include submenus that control the display of waveform data on the display screen. For example, options may include the ability to search for a desired event by entering an event's description, or source file/line number, the ability to suppress particular events, and the ability to textually list all events that are displayed in a particular row.

The waveform display tool can also be configured to link to and display the source code associated with a particular subroutine represented by a waveform object. Using this feature, a user would select the waveform (e.g., by double-clicking on the event waveform) and the waveform display tool would respond by displaying a window that displays the source code. To further enhance the analysis available through the waveform display, the waveform display tool could also be configured to provide summary information for all displayed events. Such a summary could include the number of times a particular function or program appears, the total time represented by all such occurrences, the total time represented by all such occurrences and including time spent in nested events. Once a summary is compiled, the waveform display tool can be used to sort (in ascending or descending order) the summary information by various criteria.

Although particular functions and capabilities have been discussed in relation to the waveform display tool, it should be noted that many other similar functions are possible, and that the above mentioned functions are provided as examples of such functions.

The waveform objects for the programs and subroutines in FIG. 9 are illustrated as blocks with various cross-hatch fill patterns for purposes of easily distinguishing adjacent boxes. It is to be understood however, that the display of the boxes is not necessarily limited to such a display pattern. For one embodiment of the present invention, the blocks are displayed in various random colors to facilitate distinction between adjacent boxes. In an alternative embodiment, a color code may be assigned such that a particular color represents a particular type of subroutine or loop.

In the foregoing, a system has been described for assisting software developers in analyzing the real-time performance characteristics of their programs. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of displaying an execution sequence of a first computer program comprising a plurality of subprograms, said method comprising:

measuring an execution time duration of the plurality of subprograms;

representing the execution time duration of the plurality of subprograms as graphic objects, wherein each of the plurality of subprograms has a corresponding graphic object; and displaying the graphic objects such that a first characteristic of said graphic objects, displayed along a first axis, represents the execution time duration, and a second characteristic of said graphic objects, displayed along a second axis, represents a hierarchical relationship among the plurality of subprograms, such that higher levels in the hierarchical relationship represent higher levels of functionality, and each lower level is directly under a single graphic object at an immediately higher level.

2. The method of claim 1 wherein the step of measuring the execution time duration of said plurality of subprograms further comprises calling a timer subprogram at the beginning and end of each of said one or more subprograms.

3. The method of claim 1 wherein each of said graphic objects is a block, and said first characteristic is a length of said block.

4. The method of claim 3 wherein said hierarchical relationship comprises a first subprogram of said plurality of subprograms calling a second subprogram of said plurality of subprograms, and wherein an execution duration of said second subprogram is not longer than the execution duration of said first subprogram.

5. The method of claim 4 wherein said second characteristic is the relative vertical position of said graphic object on a display device.

6. The method of claim 5 wherein a graphic object representing said second program execution time duration is displayed below a graphic object representing said first program execution time duration.

7. The method of claim 6 wherein said graphic objects are displayed on a display screen of a graphic user interface, said graphic user interface comprising commands allowing a user to manipulate the display of said graphic objects.

8. The method of claim 7 wherein said commands include commands for altering the display size of said graphic objects and suppressing the display of one or more of said graphic objects.

9. The method of claim 7 wherein said graphic user interface includes a vertical number sequence assigning a number to graphic objects in a particular region of said display screen, and further including a vertical scroll bar for scrolling vertically to display said hierarchical relationship among said plurality of subprograms.

10. The method of claim 9 wherein said graphical user interface includes a timeline for measuring a length of said graphic objects as a unit of time, and further including a horizontal scroll bar for scrolling across different segments of time on said timeline.

11. The method of claim 10 further comprising the step of displaying execution time of a second computer program comprising one or more subroutines, said step of displaying comprising the steps of:

measuring the execution time duration of said one or more subroutines; and representing said execution time duration of each of said one or more subroutines as a subroutine graphic object.

12. The method of claim 11 further comprising calling a timer subprogram at the beginning and end of each of said one or more subroutines.

13. The method of claim 12 further comprising displaying said second program and said one or more subroutines on said timeline, wherein the time relationship between said first program and said second program is synchronized.

14. The method of claim 3 wherein a third characteristic of said graphic objects represents a function of a subprogram corresponding to said graphic objects.

15. The method of claim 14 wherein said third characteristic is a user assigned text label.

16. The method of claim 14 wherein said third characteristic is a color.

17. The method of claim 1 further comprising:

measuring execution time of an event within said first program;

representing said execution time of said event as an event graphic object; and displaying said event graphic object on a display device, wherein said event graphic object is superimposed on the graphic object representing a subroutine in which said event occurs.

18. A method of capturing and displaying timing data for execution of a computer program, said method comprising:

defining a timer subprogram;

inserting a first call to said timer subprogram in said computer program, said first call starting a timer;

inserting a second call to said timer subprogram in said computer program, said second call stopping said timer;

storing timing data produced by said timer in a timing database upon execution of said computer program, said timing data representing a time duration between said first call and said second call;

transforming said timing data into waveform data;

representing said waveform data by one or more graphic objects, a characteristic of each of said one or more graphic objects representing said time duration and a second characteristic representing a hierarchical relationship between the graphic objects, and a lower level graphic object located below a higher level graphic object which invoked the lower level graphic object; and displaying said one or more graphic objects on a display device.

19. The method of claim 18 further comprising:

inserting a third call to said timer subprogram, said third call corresponding to an event within said computer program and said third call marking the time at which said event occurs;

storing an event timing data produced by said third call, said event timing data representing said time at which said third call occurs;

transforming said event timing data into event waveform data, said event waveform data represented by a graphical event object, a characteristic of said graphical event object representing said time at said event occurs; and displaying said graphical event object on said display device.

20. The method of claim 19 wherein said computer program comprises a plurality of subroutines, said method further comprising:

inserting said first call to the timer subprogram at the beginning of each subroutine of said plurality of subroutines; and inserting said second call to the timer subprogram at the end of each subroutine of said plurality of subroutines.

21. The method of claim 20 wherein said plurality of subroutines are arranged in a hierarchically nested relationship such that lower level subroutines of said plurality of subroutines are called by higher level subroutines, said method further comprising:

inserting said first call at the beginning of each lower level subroutine of said lower level subroutines; and inserting said second call at the end of each lower level subroutine of said lower level subroutines.

22. The method of claim 21 wherein said displaying step further comprises:

representing each of said one or more graphic objects as a waveform, said first characteristic comprising a length of a positive portion of said waveform;

displaying said one or more graphic objects on a time line; and displaying said hierarchically nested relationship among said higher level subroutines and said lower level subroutines in a vertical display such that each higher level subroutine is displayed above each corresponding lower level subroutine.

23. The method of claim 19 wherein displaying said graphical event object further comprises displaying said graphical event object on a time line, and wherein said graphical event object is represented as a vertical line, said characteristic of said graphical event object comprising the placement of said vertical line relative to said time-line.

24. The method of claim 20 wherein said computer program is a test program for testing integrated circuit devices in automatic test equipment, and each subroutine of said plurality of subroutines performs a particular test function.

25. The method of claim 18 wherein transforming said timing data into waveform data further comprises:

transforming said timing data into function level data;

storing said function level data in a function level array; and transforming said function level data into said waveform data.

26. The method of claim 25 wherein said timer subprogram is class defined within the computer C++ language.

27. The method of claim 25 wherein said first call is a C++ constructor function, and said second call is a C++ destructor function.

28. A memory containing a sequence of instructions, said sequence of instructions being executable by a processor, and which, when executed by said processor causes said processor to perform the steps of:

measuring an execution time duration of one or more subprograms within a first computer program;

representing said execution time duration of each of said one or more subprograms as a graphic object, the graphic object having multiple characteristics; and displaying said graphic objects on a display device such that a first characteristic of each of said graphic objects represents said execution time duration, and a second characteristic of each of said graphic objects represents a hierarchical relationship among said one or more subprograms, such that higher levels in the hierarchical relationship represent higher levels of functionality, and no lower level spans multiple graphic objects at a higher levels.

29. The memory of claim 28 further containing instructions that cause said processor to perform the steps of:

measuring the execution time duration of an event within said first program;

representing said execution time duration of said event as an event graphic object; and displaying said event graphic object on said display device, wherein said event graphic object is superimposed on the graphic object representing a subprogram in which said event occurs.

30. The memory of claim 28 further containing instructions that cause said processor to perform the steps of:

displaying said graphic objects on a display screen of a graphic user interface, said graphic user interface comprising commands allowing a user to manipulate the display of said graphic objects;

displaying a timeline on said display screen for measuring a length of said graphic objects as a unit of time;

displaying a horizontal scroll bar on said display screen for scrolling across different segments of time on said timeline;

displaying a vertical number sequence on said display screen;

assigning a number of said vertical number sequence to graphic objects in a particular region of said display screen; and displaying a vertical scroll bar on said display screen for scrolling vertically to display said hierarchical relationship among said one or more subprograms, wherein said hierarchical relationship comprises a first subprogram of said one or more subprograms calling a second subprogram of said one or more subprograms, and wherein the execution time duration of said second subprogram is not longer than the execution time duration of said first subprogram.

31. The memory of claim 30 further including instructions that cause said processor to perform a step of displaying the execution time duration of a second computer program comprising one or more subroutines, said step of displaying the execution time of said second computer program comprising the steps of:

measuring the execution time duration of said one or more subroutines; and representing the execution time duration of each of said one or more subroutines as a subroutine graphic object.

32. The memory of claim 31 further including instructions that cause said processor to perform the step of displaying the execution time duration of said second program and said one or more subroutines on said time line, wherein the time relationship between said first program and said second program is synchronized.

33. A memory containing a computer program including a sequence of instructions, said sequence of instructions being executable by a processor, and which, when executed by said processor causes said processor to perform the steps of:

defining a timer subprogram;

inserting a first call to said timer subprogram in said computer program, said first call starting a timer;

inserting a second call to said timer subprogram in said computer program, said second call stopping said timer;

storing timing data produced by said timer in a timing database upon execution of said computer program, said timing data representing a time duration between said first call and said second call;

transforming said timing data into waveform data;

representing said waveform data by one or more graphic objects, a characteristic of each of said one or more graphic objects representing said time duration and a second characteristic representing a hierarchical relationship between the graphic objects, such that higher levels in the hierarchical relationship represent higher levels of functionality, and each lower level is directly under a single graphic object at an immediately higher level; and displaying said one or more graphic objects on a display device.

34. The memory of claim 33 further including instructions that cause said processor to perform the steps of:

inserting a third call to said timer subprogram, said third call corresponding to an event within said computer program and said third call marking the time at which said event occurs;

storing an event timing data produced by said third call, said event timing data representing said time at which said third call occurs;

transforming said event timing data into event waveform data, said event waveform data represented by a graphical event object, a characteristic of said graphical event object representing said time at said event occurs; and displaying said graphical event object on said display device.

35. The memory of claim 34 further including instructions which cause said processor to perform the step of displaying said graphical event object on a time-line, and wherein said graphical event object is represented as a vertical line, said characteristic of said graphical event object comprising the placement of said vertical line relative to said time-line.

36. The memory of claim 33 further including instructions that cause said processor to perform the step of:

representing each of said one or more graphic objects as a waveform, said characteristic comprising a length of a positive portion of said waveform;

displaying said one or more graphic objects on a time-line; and displaying a hierarchically nested relationship among subroutines represented by the event timing data, such that graphic objects for higher level subroutines are displayed above graphic objects for lower level subroutines in a vertical display.

37. The memory of claim 33 further including instructions that cause said processor to perform the steps of:

transforming said timing data into function level data;

storing said function level data in a function level array; and transforming said function level data into said waveform data.

38. A computer-readable medium having stored thereon a plurality of sequences of instructions, said plurality of sequences of instructions including sequences of instructions which, when executed by a processor, cause said processor to perform the steps of:

measuring an execution time duration of one or more subprograms within a computer program;

representing said execution time duration of said one or more subprograms as graphic objects, wherein each of said graphic objects corresponds to a subprogram of said one or more subprograms; and displaying said graphic objects on a display such that a location along a first axis of said graphic objects represents said execution time duration, and the location along a second axis of said graphic objects represents a hierarchical relationship among said one or more subprograms, such that a first graphic object representing a first subprogram that is called by a second subprogram is illustrated below a second graphic object representing the second subprogram, and the first graphic object does not extend beyond the second graphic object.

* * * * *